United States Patent [19]

Johnsen

[11] 3,945,870
[45] Mar. 23, 1976

[54] METHOD OF MAKING MULTI-LAYER COMPOSITE AND ARTICLES THEREFROM

[76] Inventor: Edward L. Johnsen, 12 Fox Meadow Lane, Wayland, Mass. 01778

[22] Filed: July 24, 1973

[21] Appl. No.: 382,162

[52] U.S. Cl. ............... 156/201; 156/249; 156/257; 156/269; 156/277; 156/278; 156/289; 156/290; 156/301; 283/6; 428/124; 428/195
[51] Int. Cl.² ........................................ B42D 15/00
[58] Field of Search ........... 156/202, 204, 211, 226, 156/227, 247, 249, 253, 268, 277, 269, 257, 267, 289, 344, 201, 259, 290, 278, 387, 386, 384, 554, 301; 283/6, 18; 161/51, 102, 138, 146; 428/124, 195

[56] References Cited

UNITED STATES PATENTS

| 1,982,611 | 11/1934 | Hartnett | 283/6 |
| 2,108,749 | 2/1938 | Harris | 283/6 |
| 3,106,506 | 10/1963 | Anderau | 156/384 |
| 3,546,053 | 12/1970 | Goldberg et al. | 156/247 |
| 3,711,353 | 1/1973 | Zimmer | 156/277 |
| 3,749,631 | 7/1973 | Batchelder et al. | 156/384 |
| 3,840,421 | 10/1974 | Peterson | 156/277 |

Primary Examiner—William A. Powell
Assistant Examiner—Jerome W. Massie
Attorney, Agent, or Firm—J. Warren Kinney, Jr.

[57] ABSTRACT

An endless multi-layer composite is provided for subsequent processing into articles on a mass production, continuous basis.

16 Claims, 22 Drawing Figures

METHOD OF MAKING MULTI-LAYER COMPOSITE AND ARTICLES THEREFROM

BACKGROUND OF THE INVENTION

The present invention relates generally to business forms, particularly to an endless multi-layer composite for subsequent processing and to the articles producible therefrom. The invention covers both the method of producing the endless composite and articles as well as the unqiue composite and the resulting articles.

In the past, a variety of multi-layer and multi-ply articles have been developed and utilized. Common disadvantages have been encountered when manufacturing each of these several articles. Two such articles are, for example, chance or lottery tickets wherein original indicia is to be applied to a portion thereof and concealed from view for later selective exposure, and filing devices wherein a mounting board or carrier sheet containing a pressure sensitive adhesive is utilized for assembly and filing of various documents.

While these articles vary greatly with respect to use and format, each presents similar manufacturing problems. Neither of the articles has heretofore been producible from a single, endless web, permitting processing and manufacture from a continuous automated process while meeting all critical requirements of each final article form.

This single disadvantage has generated a variety of solutions, each limited to a particular, narrowly construed article form. For example, where articles such as lottery or chance tickets or the like require a high degree of secrecy, it is desirable that the concealed indicia be originally applied to the inner surface of the ticket and concealed for later selective exposure. No system previously disclosed permits the original application of concealed indicia with the required degree of secrecy, while permitting production in a continuous automated process. Two ticket formats have been devised, depending on the intended usage, each having limitations preventing their wide-spread acceptance. The first ticket format allows concealment of original indicia and maintains an acceptable degree of secrecy, for example, any of the tickets disclosed in each of U.S. Pat. Nos. 1,980,004; 2,108,749; and 2,180,808. In each of these patents, the indicia to be concealed is originally applied, and then concealed by placing a panel in overlying relationship therewith, the panel either partially or completely removable to later selectively expose the indicia. However, none of the patents in this group discloses nor suggests an article producible by mass production techniques while retaining or achieving the desired degree of secrecy.

The second ticket format permits mass production, however it is not tamper-proof and not acceptable for lottery games or similar gaming devices. An example of a ticket of this format is disclosed in U.S. Pat. No. 2,023,829. As described therein, the indicia is only partly concealed and may be exposed at will, only minimal secrecy being maintained. The ticket of U.S. Pat. No. 2,023,829 is of two-ply construction, produced from a blank containing a center fold line, the fold line defining two hinged panels. The blank is further separated by cross weakened lines. One panel of the blank contains an adhesive substance extending along the outer edge, each section of said panel adapted to receive indicia to be later concealed by folding the second panel thereupon along the center fold line. The second panel contains a hinged flap, corresponding to the location of each indicia, for later selective exposure. As disclosed, the final ticket is not designed nor is it adapted to maintain a high degree of secrecy with respect to the nature of the concealed indicia. The flap may be simply lifted to expose the indicia, and the end portions of each ticket are not sealed.

An article having similar production disadvantages, though different in form is a filing carrier sheet as disclosed in U.S. Pat. Nos. 3,043,734 and 3,740,879. Each of these patents discloses a filing device for assembling papers, such as medical records, in a shingled relationship by providing a carrier sheet having a pressure-sensitive adhesive supplied thereto for attaching various documents. The carrier sheet of U.S. Pat. No. 3,043,734 includes a wide band of adhesive covered with a protective release sheet, the release sheet being cut into transverse strips, each strip being selectively removable to expose a portion of the adhesive. The carrier sheet of U.S. Pat. No. 3,740,879 includes a longitudinal strip of adhesive extending the length of one marginal edge, and a release sheet sectioned into independently removable portions covering the adhesive. Opposite the adhesive strip and adjacent another marginal edge of the carrier sheet is a series of adhesive spots also covered with the removable release sheet. By removing one section of the release sheet from the adhesive strip and the release sheet covering the corresponding adhesive spot, documents may be attached to the carrier sheet in a manner similar to that of U.S. Pat. No. 3,043,734.

While U.S. Pat. No. 3,043,734 suggests the manner of making the article disclosed therein, neither patent discloses nor suggests the manufacture of carrier sheets from an endless composite web in a continuous, automated process.

Thus, each of the article forms herein described have singular disadvantages in that neither is producible in mass quantities from a continuous process while meeting certain critical requirements.

The present invention provides a single, unique solution to each of the problems in manufacturing the various article formats by providing an endless multi-layer composite adapted to be further processed to generate either lottery tickets containing originally applied concealed indicia or filing carrier sheets for use in attaching documents in a predetermined, accessible order.

The present invention discloses a unique, multi-layer composite from which a variety of articles may be produced. The composite consists of three basic layers: an endless web of base material, a layer of pressure sensitive adhesive selectively applied to the base material, and an endless web of readily removable protective release material placed in overlying relationship therewith. By selectively applying adhesive and performing certain preliminary manufacturing steps on the base material and/or the release material, the present invention provides a suitable multi-layer composite for continuously producing in mass quantities the articles of either of the described formats.

Therefore, the present invention not only provides a unique multi-layer material composite, but also a variety of unique articles of independent and distinct format, each of the articles adapted to similar mass production techniques and producible from the unique, continuous multi-layer composite of the present invention as well as the method for producing each.

DESCRIPTION OF THE DRAWINGS

FIG. 4 is a plan view of a multi-layer composite ready for storage or further processing with components thereof broken away for clarity of detail and understanding and as shown at 4—4 of FIG. 3a.

FIG. 5 is a view similar to FIG. 4, illustrating the multi-layer composite with original indicia applied, as shown at 5—5 of FIG. 3a.

DETAILED DESCRIPTION

FIGS. 1, 2, 3a, and 3b diagrammatically illustrate the steps for producing the multi-layer composite and various articles of the present invention. FIGS. 4–8 illustrate a first exemplary article producible by the method of FIGS. 3a. FIGS. 9–21 illustrate several alternative embodiments of a second article producible by the method of FIG. 3b.

Figures 1, 2, 3A, 3B:
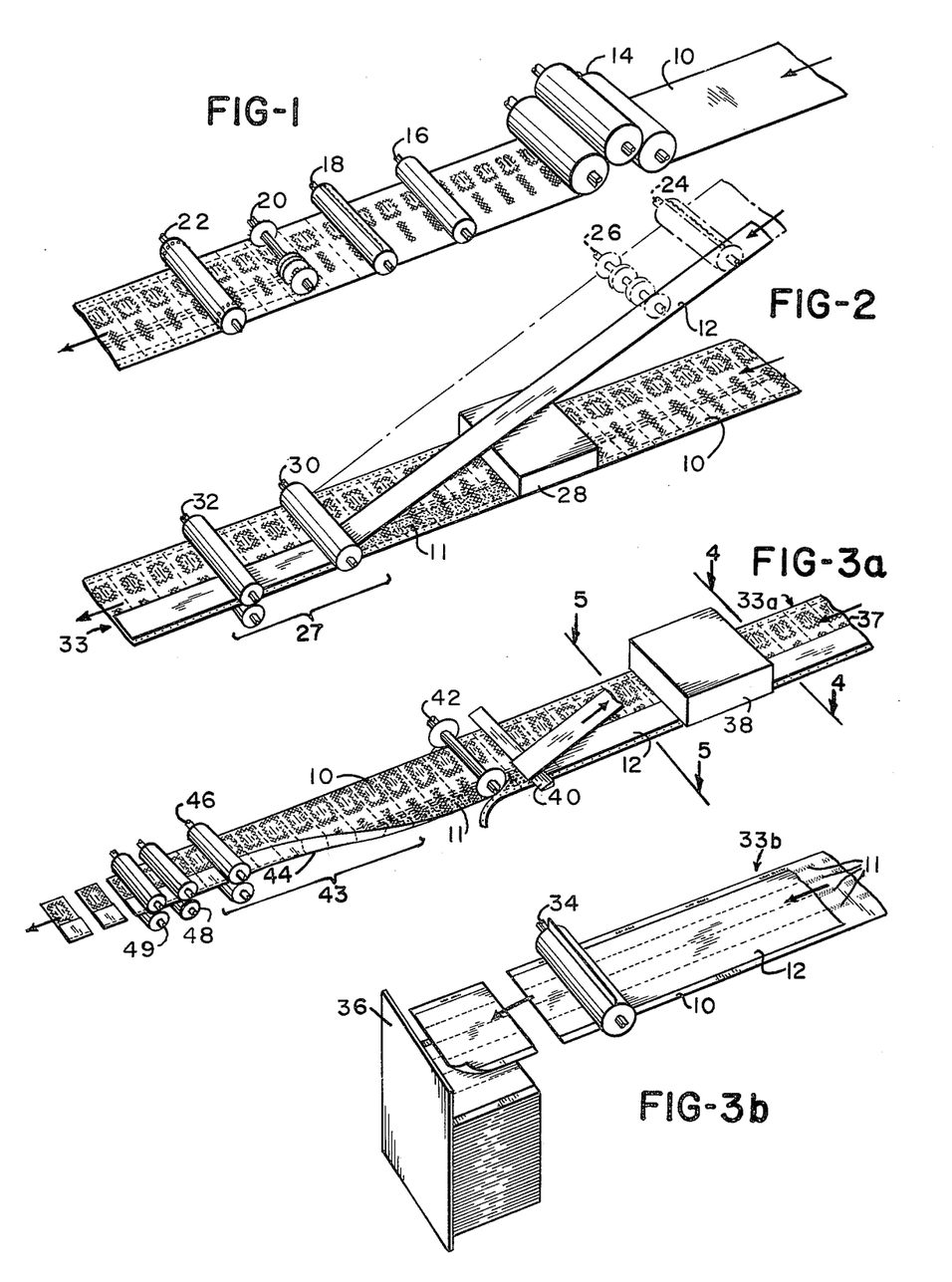
FIGS. 1 and 2 are diagrammatic illustrations of the preliminary processing steps in the manufacture of articles which embody the teachings of the present invention.
FIG. 3a diagrammatically illustrates a method for producing a first article from the multi-layer composite of FIG. 2.
FIG. 3b diagrammatically illustrates a method for producing a second article from the multi-layer composite of FIG. 2.

The multi-layer composite of the present invention is shown generally as a continuous, composite web 33 (see FIG. 2) consisting of three material layers and is produced by the process of FIG. 2. The composite is adapted for subsequent processing to form each of the articles illustrated in FIGS. 8, 9, 15, 16, and 20. The web 33 consists generally of a web or layer of base material 10, a layer of pressure sensitive adhesive 11 selectively applied in a predetermined pattern to the base material, and a web or layer of release material 12 having a surface temporarily adherent to and readily strippable from the adhesive, the release material overlying that portion of the base material containing the adhesive. The adhesive 11 is of the type having natural affinity for the surface of the base material, and, once applied, becomes an integral part thereof. The release material 12 includes a surface that is temporarily adherent to, but readily strippable from, the adhesive to selectively expose desired portions thereof. While various processing steps have been illustrated in both FIGS. 1 and 2, the steps basic to formation of the web 33 are illustrated generally in FIG. 2 and include: (1) supplying an endless web of base material 10 at a fixed, substantially constant feed rate to an adhesive applicating mechanism 28 and (2) collating an endless web of release material 12 therewith, protecting the pressure sensitive adhesive, at 27. The collating station 27 generally includes mating the two endless webs and registering the webs in proper relationship at 30 and ensuring proper adherence of the release material to the adhesive at 32.

While these basic steps define the manufacturing process necessary to produce the composite web 33, various other steps preliminarily performed on the various composite components or subsequently performed on the final composite are desirable where particular articles are to be manufactured. However, all of the articles included herein are generated from the basic multi-layer composite including a base layer 10, a pressure sensitive adhesive layer 11 applied thereto and an overlying release layer 12.

In general, a variety of distinctly varying articles are producible from the web 33, including both articles containing only the base 10 and adhesive 11, and articles containing all three material layers. The first article utilizes the adhesive to form a closed pocket for concealing originally applied indicia to generate, for example, a lottery ticket. The second article contains at least one region of selectively exposable pressure sensitive adhesive for attaching secondary articles thereto. FIG. 3a includes the basic process steps for producing the first article, while FIG. 3b includes the basic steps for producing the second. Exemplary articles are illustrated in FIGS. 4–21.

Starting with the composite web 33, the basic steps producing the first article include: (1) separating the release material from the adhesive 11 and base 10, at 40 of FIG. 3a, and (2) folding the portion of the base sheet containing adhesive onto a portion not containing adhesive at 43, including both folding at 44 and securing at 46. Since the adhesive 11 will have an equal affinity for both portions of the base 10, the two portions are permanently sealed to form a two-ply format. The web is then separated into independent articles by bursting or cutting at 48 and 49.

To produce the second article, only one additional step subsequent to formation of the web 33 need be performed, as illustrated in FIG. 3b. The web 33 is simply sliced into predetermined length sections as shown at 34, and stored at 36.

Thus, two distinct articles are obtainable from the composite web 33 by performing distinct auxiliary operations prior to collating or after the basic web has been produced.

In summary, the only required steps for producing the composite web 33 are illustrated in FIG. 2, viz: providing a continuous base 10; selectively applying a pressure sensitive adhesive 11 at 28; and collating a suitable release sheet 12 with the base sheet 10 and adhesive 11, at 27. Steps 14, 16, 18, 20, 22, 24, and 26 are auxiliary preliminary steps, generally optional, and are not inherent in the production of the multi-layer composite herein described.

The first article, see FIGS. 4–8, is produced by separating or stripping the release sheet 12 from the base sheet 10 at 40, folding the base sheet at 43, bringing portions thereof into overlapping adhesively secured relationship, and bursting the form into independent articles at 48 and 49, as illustrated in FIG. 3a. Steps 38 and 42 are not inherent to the process, but are required for the particular embodiment as herein described in detail.

The second article, see FIGS. 9–21, is provided by simply cutting the composite web into predetermined length sections at 34 as shown in FIG. 3b. It should be understood that other steps could be here included if desired.

Figure 4:
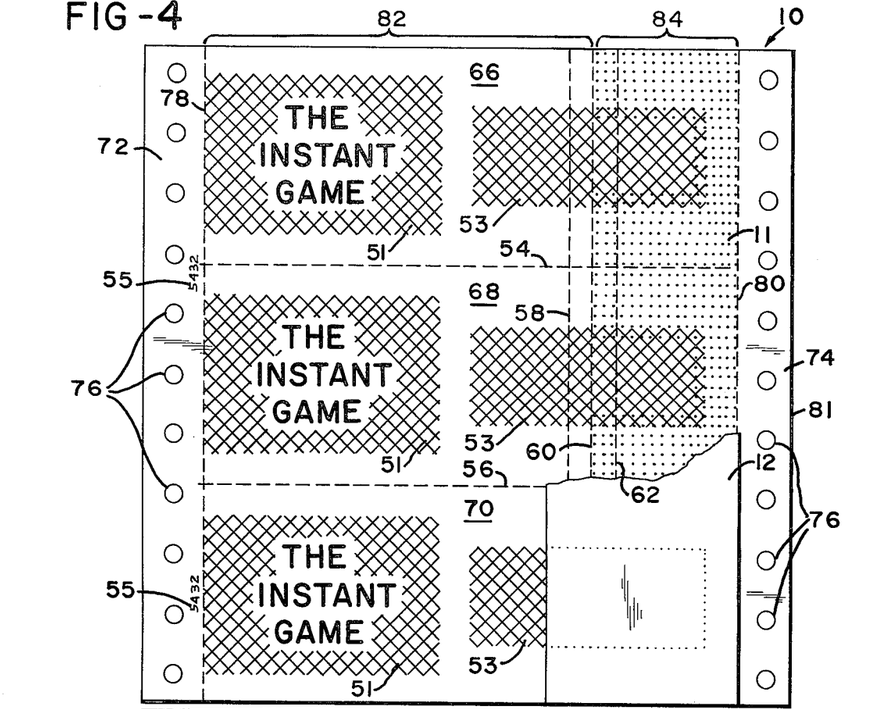
Figure 5:
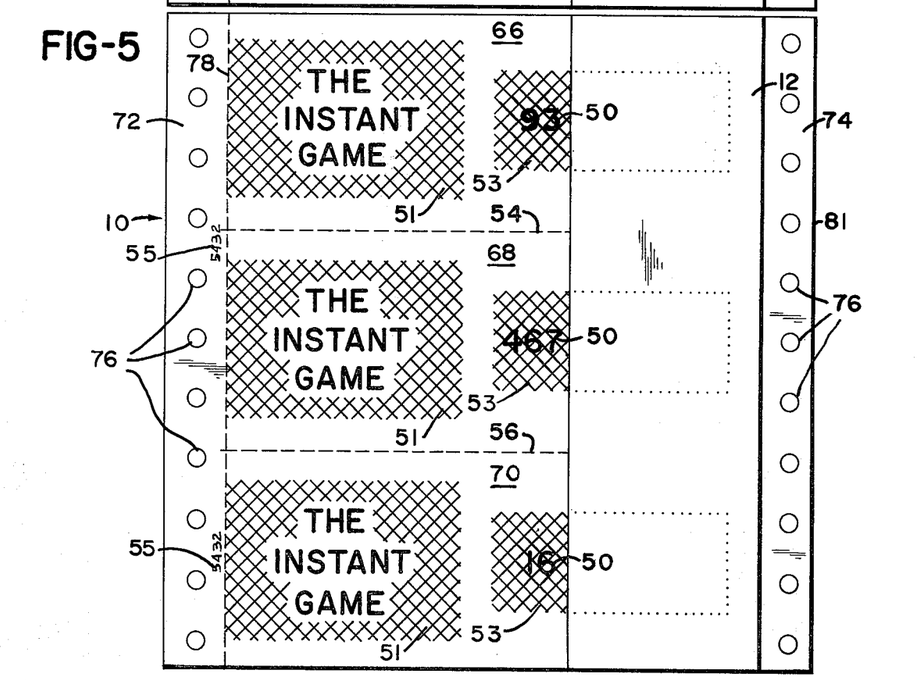

The first article is illustrated in FIGS. 4–8, the preliminary steps of FIG. 1 and auxiliary steps of FIG. 3a being here utilized to produce the article from the composite web 33. Referring to FIG. 4, the base 10 of the composite web requires certain preliminary steps prior to applying the adhesive thereto and collating the release sheet 12 therewith. In the present example, the base 10 is printed at 14 with certain indicia, for example, the periodically repeated background patterns 51 and 53 and THE INSTANT GAME. The base sheet next periodically receives numerals 55 or other identifying indicia indicating form number, run, date, or other inventory or control data. This number is printed at station 16 and is generally placed on a discardable portion, being removed from the form prior to culmination in a final article. The base sheet 10 is then separated into a pair of elongate panels 82 and 84, the panels spanning the width of the sheet and extending the length thereof, by providing a continuous foldline 60 at station 20. The foldline is generally scored or provided by a series of perforations. Therefore the adjacent panels 82 and 84 are interconnected, having a common boundary at foldline 60. One of the panels, for example panel 84, substantially contains the entire pattern of adhesive 11 and is subsequently covered with the release sheet 12, while the other panel remains exposed, adapted to receive original applied indicia as illustrated in FIG. 5.

It is also convenient to provide the other necessary continuous weakened lines at station 20. Tear lines 58 and 62 are spaced equidistant from and on either side of line 60 to provide a tear tab as hereinafter described. Tear line 78 is placed adjacent the left edge to define margin region 72 and separate it from panel 82, and tear line 80 likewise provides a boundary between margin region 74 and panel 84.

Sprocket or track holes 76 are also provided at punching station 22. These holes provide a feed track for aligning and feeding the form through particular steps in the process, and are contained in the margin regions so that they may be removed prior to production of the final article.

Figure 6:
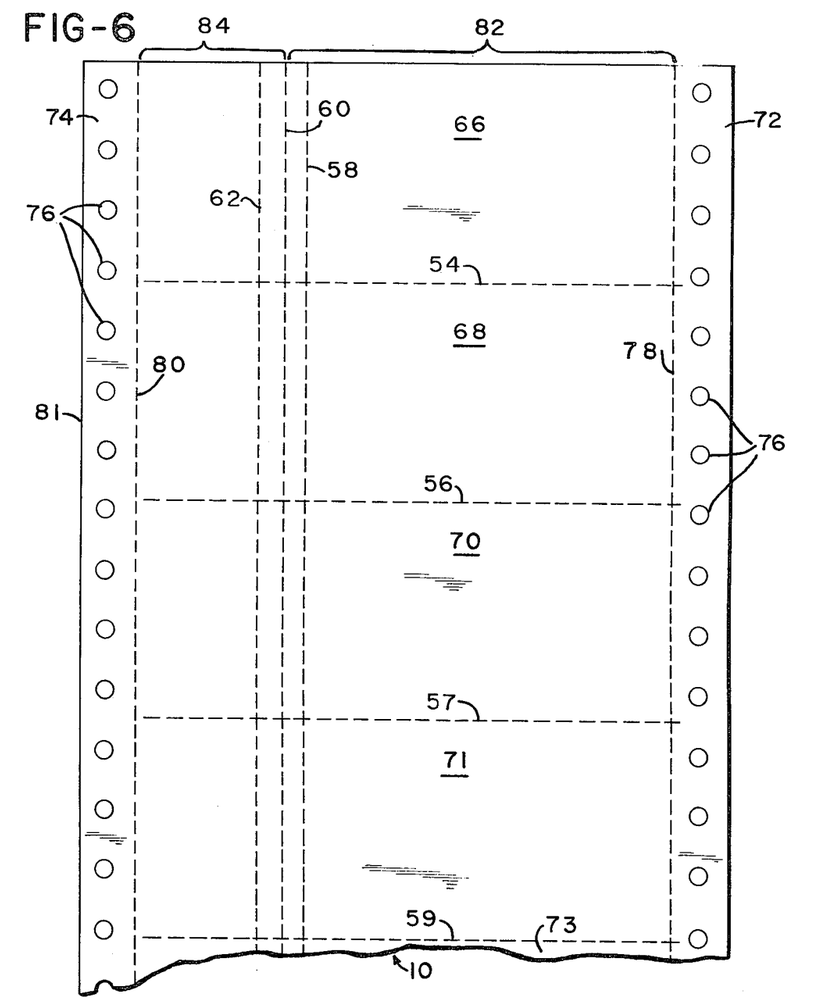
FIG. 6 is a plan view of the underside of the multi-layer composite of FIG. 4.

While not necessary, it is desirable to also divide the base sheet into predetermined length sections, each length section comprising the elements of a complete independent article, for example the ticket sections 66, 68, 70, 71 and 73 as shown in FIGS. 4, 5 and 6. Each ticket section comprises opaque regions 51 and 53 with the included indicia and spans the entire width of the base sheet, encompassing panels 82 and 84. The ticket sections are defined by providing weakened lines 54, 56, 57 and 59 at station 18 of FIG. 1.

At this point, the preliminary steps performed on base sheet 10 are complete, and the base sheet is properly prepared for receiving adhesive 11 and the release sheet 12 to provide the composite web 33. It should be understood that the preliminary steps could be performed in any order and that certain steps could be deleted, while certain others could be added without departing from the scope of the invention. The particular preliminary steps are defined by the final article and not by the particular composite used in producing that article.

Therefore, the preliminary steps illustrated in FIG. 1 prepare the base 10 prior to generation of the composite web 33. The composite web 33 is produced by the three basic steps shown in FIG. 2: (1) supplying a properly prepared endless web of base material 10 at a relatively constant feed rate to an adhesive applying station 28, (2) selectively applying pressure sensitive adhesive 11 in a predetermined pattern at station 28, and (3) collating an endless web of protective release material 12 with the base material 10 and in overlying relationship with the adhesive at 27.

In the embodiment of FIGS. 4–8, the base 10 as prepared in FIG. 1 is now prepared for the adhesive applying station 28 where adhesive 11 is applied in the predetermined pattern shown in FIG. 4. The adhesive is contained entirely within panel 84 of the base sheet 10, bounded by lines 60 and 80. Further, the adhesive is selectively applied within panel 84, leaving a portion of the opaque background region 53 substantially exposed. Release sheet 12 is then placed in overlying relationship therewith at step 27 of FIG. 2, preparing the composite web for addition of concealed indicia. As illustrated in FIG. 4, the release sheet completely covers the adhesive pattern, here panel 84. Where desired, the release sheet could extend over to elongate edge 81 of the base, covering margin region 74 and sprocket holes 76. When this is done the release sheet would also contain marginal sprocket holes for providing precise alignment of the release sheet 12 with base 10. This registration and alignment may be provided at station 30, but is not necessary to the present embodiment. The release sheet is next nipped to the adhesive to ensure proper bonding at station 32, forming the particular composite web 33 for use in producing the article of FIGS. 4–8.

The completed web 33, as shown in FIG. 4, is now prepared for the final processing steps necessary to produce the first article, i.e. a lottery ticket or the like containing concealed, originally applied indicia that is to be later selectively exposed.

The web 33 in the form illustrated in FIG. 4 and designated 33a in FIG. 3a is supplied to initial point 37 of the process of FIG. 3a. As clearly illustrated on the underside of the web, as shown in FIG. 6, the base material contains a continuous series of length sections 66, 68, 70, 71, and 73 constituting individual, complete ticket forms, separated by transverse weakened lines 54, 56, 57, and 59, each section composed of the panels 82 and 84, respectively. As shown in FIG. 4, the adhesive 11 is completely contained in one panel, here panel 84, and is protected by release sheet 12. The web is now ready to receive original indicia to be later concealed. The web is fed through a suitable printing station 38 where the indicia 50 is applied, here the numerals "93," "467," and "16" as illustrated in FIG. 5.

When indicia is applied in this manner, it is necessary to have release sheet 12 overlying the adhesive 11, ensuring proper flow of the web through station 38. After this step is complete, the release sheet may be separated from the adhesive by stripping or peeling at 40. Further, when the indicia 50 is added at station 38, particularly in the present embodiment, where the indicia indicates winning numbers of a lottery, it is necessary to ensure proper registry of the web with the printer. Sprocket holes 76 provide proper registry, thereby ensuring placement of the indicia within each background region 53. This is particularly beneficial when the printing is done by computer or other automated process where winning numbers are supplied in random sequence.

After application of the indicia 50 at mechanism 38, the release sheet 12 is removed at stripper 40. The endless web of base material is now ready to fold, along foldline 60, bringing panels 82 and 84 into overlapping, adhesively secured relationship, concealing the indicia 50 therebetween. The margin regions 72 and 74 are no longer necessary, the printing operation being complete, and are removed by slitting or another suitable method at 42. The remaining base sheet consisting of panels 82 and 84 and divided into predefined length sections 66, 68, 70, 71, and 73 by weakened lines 54, 56, 57, and 59 is then folded along line 60 at step 44. To ensure proper binding of the panels to one another, a nip roll 46 is provided, nipping the folded-over panel 84 onto panel 82. The natural affinity of the adhesive for the base material ensures permanent attachment of the two panels. The form next goes through bursting process 48 and 49 to separate the individual length sections 66, 68, 70, 71, and 73 from one another along lines 54, 56, 57, and 59 to generate individual articles, for example ticket 70 as illustrated in FIG. 7.

Figure 7:
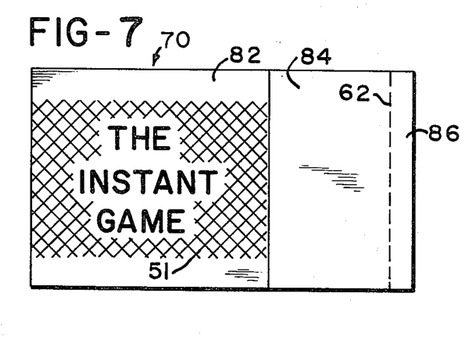
FIG. 7 is a plan view of a first article produced from the multi-layer composite of FIG. 2.

The ticket illustrated in FIG. 7 includes the panel 82 with the entire panel 84 folded thereon. The adhesive pattern see FIG. 4, contained on the right panel 84 circumscribes the region 53 to form a seal around the printed indicia 50, providing an uncoated pocket region for permitting selective exposure of the indicia. As can be seen, by utilizing the patterned adhesive 11, the concealed indicia 50 is sealed on all four sides, the adhesive forming a seal on three sides and the foldline 60 between panel 84 and panel 82 forming the seal on the fourth side. The indicia 50 is completely contained in a sealed pocket non-coated with adhesive, and is interposed between opaque layers, thus providing a virtually tamper-proof ticket.

Figure 8:
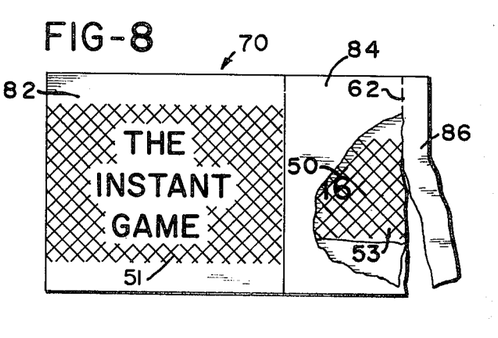
FIG. 8 is a view similar to FIG. 7, illustrating the manner in which the concealed indicia is exposed.

The elongate tear lines 58 and 62, each equidistant from line 60, see FIG. 4, are utilized to facilitate exposure of the concealed indicia 50 when desired. Then panel 84 is folded onto panel 82 along line 60, lines 58 and 62 are placed in registry forming a perforated tear tab or strip 86 along the edge of the ticket. As illustrated in FIG. 8, by removing the tear tab 86 along perforated lines 58 and 62, access to the pocket containing concealed indicia 50 is provided.

As here illustrated, the composite web 33 provides a suitable form for producing a chance ticket or the like for concealing originally applied indicia, the indicia being carried in a pocket provided by selectively applying adhesive in such a manner that the region containing the indicia is uncoated while substantially circumscribed by adhesive and thereby sealed. Access to the pocket is provided by removing a tear tab. In the present embodiment, the indicia 50 is further concealed by providing background region 53. This background is opaque, providing transfer of light therethrough, preventing preliminary determination of the contents, thus making the ticket virtually tamper-proof. By extending the background into both panels 82 and 84, the indicia 50 is interposed between two layers of opaque material when the form is folded along foldline 60.

Thus, the web 33 provides a suitable format for producing any variety of articles containing originally applied, concealed indicia, specifically a chance ticket or the like having an accessible pocket and containing concealed indicia therein.

Exemplary embodiments of a second article, wherein the release sheet 12 is included in the final product, are illustrated in FIGS. 9–21. The second articles are each produced by the basic processing steps of FIGS. 2 and 3b, i.e. supplying a properly prepared endless web of base material 10 at a relatively constant feed rate to an adhesive applying station 28, selectively applying pressure sensitive adhesive 11 in a predetermined pattern to the base, and collating an endless web of protective release material 12 with the base material and in overlying relationship with the adhesive at 27, to form the basic composite web 33. Then, as shown in FIG. 3b, the web designated 33b is cut or otherwise separated into predetermined length sections at cutter 34 to form individual articles as illustrated in FIGS. 9, 15, 16, and 20. Again, certain preliminary steps are generally performed on the base sheet 10 and/or the release sheet 12 prior to formation of the composite web. Further, certain other process steps may be added or deleted, prior to or after the formation of web 33 without departing from the scope of the invention.

Figures 9, 10:
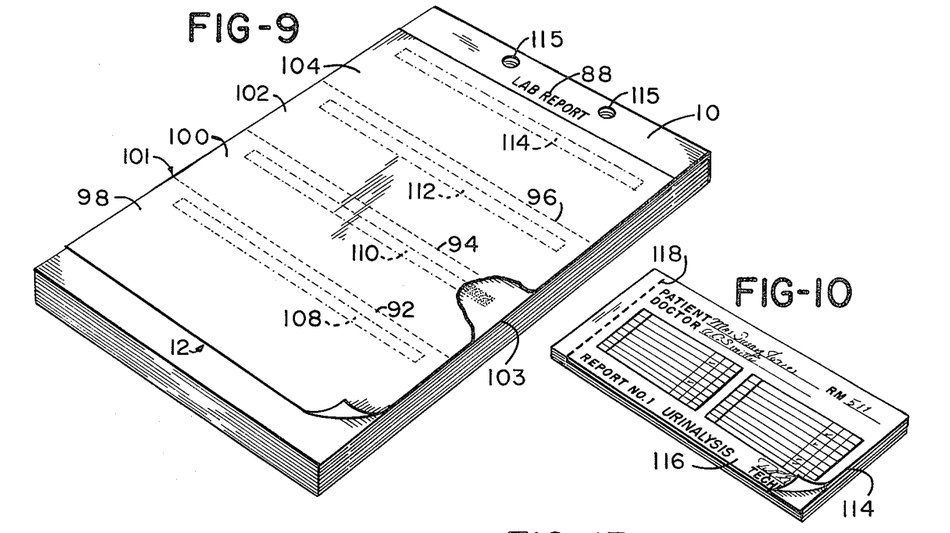
FIG. 9 is a perspective view of a second article produced from the multi-layer composite of FIG. 2.
FIG. 10 is a perspective view of a series of auxiliary articles used in conjunction with the article of FIG. 9.
Figure 11:
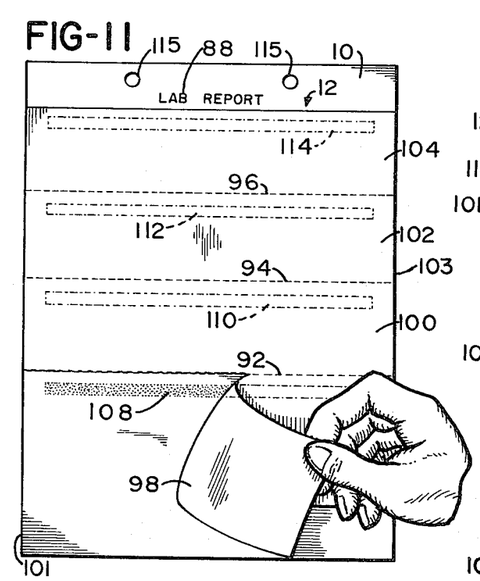
FIGS. 11, 12, 13, and 14 illustrate sequential steps in the use of the articles of FIGS. 9 and 10.

Generally, to form articles of FIGS. 9–21, the preliminary steps are less comples than those required for the first article, as illustrated in FIGS. 4–8. The base material 10 and the adhesive pattern 11 collectively define a mounting board or carrier sheet for selectively mounting auxiliary articles, and the release sheet 12 provides a protective cover for the adhesive until use. Referring to FIG. 9, the blank base sheet 10 is supplied with indicia 88, for example the words LAB REPORT at station 14. Then, where desired, run number or other identifying indicia may be added at 16. The other steps are strictly optional, and in the embodiments illustrated in FIGS. 9–21 are not utilized.

It is desirable, although not necessary, to provide separate, independently removable, panels in the release sheet 12 in order that the patterned pressure sensitive adhesive 11 may be selectively exposed. This is provided at cross-perforation station 24 and/or longitudinal-perforation station 26 illustrated in FIG. 2. The embodiment of FIGS. 9–14 includes only longitudinal-perforations, while the embodiments of FIGS. 15–18 include only cross-perforations, and the embodiment of FIGS. 20 and 21 utilizes both stations 24 and 26 to produce release sheet panels.

In the preferred embodiment of FIG. 9 the release sheet 10 substantially covers the entire base sheet 12, a small margin being left at the top and bottom. While this embodiment is illustrated in FIG. 3b, it should be understood that each modification of the second article is produced in generally the same manner. The release sheet must by nature cover the full width of the article because it is formed from a continuous web, and when the composite web 33 is cut into predetermined length sections, here defined by boundaries 101 and 103, the release sheet 12 and base sheet 10 break at the same point. The longitudinal tear lines 92, 94, and 96 extend the length of the sheet 12 and are provided at station 26 of FIG. 2. These lines define separate panels 98, 100, 102, and 104 on the release sheet, extending the width thereof and completely covering the adhesive bands 108, 110, 112, and 114 supplied at station 28. As shown in FIG. 9 the tear lines 92, 94, and 96 are each slightly above the respective adhesive band, permitting selective exposure of any of one or several of the bands at any desired time. The adhesive bands each extend substantially the width of the finished article, a small margin remaining at each end of the bands, being generated by a periodically interrupted continuous band applied at station 28. After the adhesive 11, and the properly prepared release sheet 12 have been applied to base sheet 10 to form the composite web, the web is cut into predetermined length sections, at cutting station 34, and stacked or otherwise stored at 36. It may be desirable to punch or otherwise provide mounting holes 115 at this time.

Figure 12:
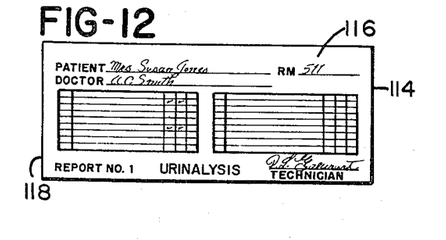
Figure 13:
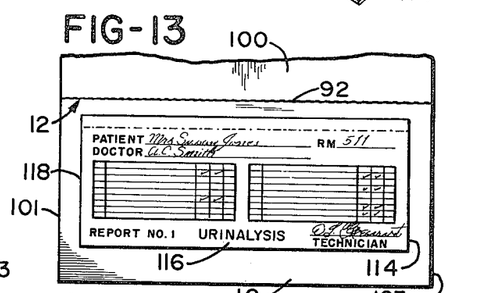

The embodiment of FIG. 9 is particularly well suited for a medical environment wherein a series of lab reports, completed in different locations, may be assembled for easy reference. Generally, a series of lab reports, for example REPORT NO. 1, designated 116 in FIG. 10 is maintained at a particular lab reporting station. At the conclusion of testing the lab report is completed and removed from the series along perforation line 118 and is ready for placement on the carrier sheet provided by the base material 10 and adhesive 11 provided by the article as cut at station 34 and as illustrated in FIG. 9. The user then removes the first panel 104 of the release sheet by tearing along line 96, exposing the first adhesive band 114. The article 116, as illustrated in FIG. 12 may then be placed over the adhesive band and attached to the base sheet as illustrated in FIG. 13.

By utilizing the patterned adhesive process indicated at station 28 of FIG. 2, it is possible to provide an adhesive band which is substantially the same length as the report 116. Therefore, none of the adhesive will extend beyond the margins 114 and 118 of the report, thus providing a suitable attachment and accumulation form for the reports without having exposed adhesive, thereby preventing the final report from accidentally adhering to another item, for example, when filing.

Figure 14:
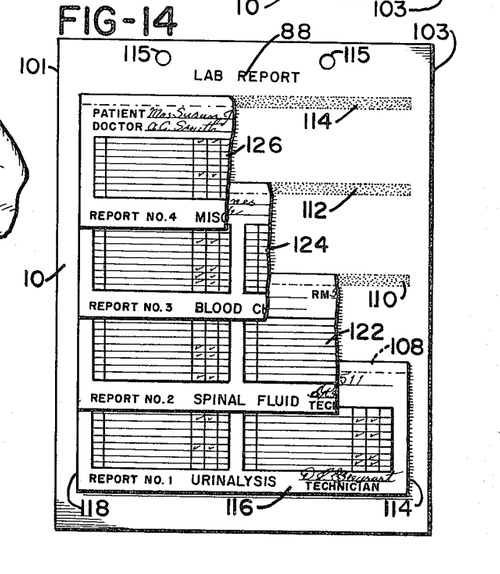

As a patient progresses from lab report station to lab report station other reports may be added to the carrier sheet simply by removing the subsequent panels 98, 100, 102, and 104 therefrom, exposing in sequence adhesive bands 108, 110, 112 and 114. The final form of the lab report carrier sheet with all the reports attached thereto is illustrated in FIG. 14, wherein each of the lab reports 116, 122, 124, and 126 are attached to respective adhesive bands 108, 110, 112, and 114 in echelon relationship. Thus, each report may be lifted to completely expose the report directly beneath it, conserving filing space while providing a full report from each lab station. As shown, the adhesive bands 108, 110, 112, and 114 do not extend beyond the full length of each report, thus ensure that the lab report and will not later become accidentally attached to external, independent articles. In the event all of the lab reports are not used, any panel of the release sheet 12 may be retained, thereby covering the adhesive, preserving it for future use, and protecting it from accidental attachment.

An alternative embodiment of a lab report is illustrated in FIGS. 15-19. Here, a single adhesive band 154 is supplied to the base sheet 10. The release sheet 12 is part of the composite web produced by the process of FIGS. 1 and 2 and as illustrated extends the full width of the lab report. However, rather than longitudinal tear lines defining panels as illustrated in the embodiment of FIG. 9, transverse tear lines 132, 134, 136, 138 and 140 extending the width of the release sheet, are provided, separating the single adhesive band into a series of individual regions 142, 144, 146, 148, 150 and 152. Thus, to expose the first portion of the adhesive band 154, the first panel of the release sheet, or panel 142 is removed. Subsequent panels of the adhesive band are exposed in the same manner.

Figures 15, 16, 17, 18, 19:
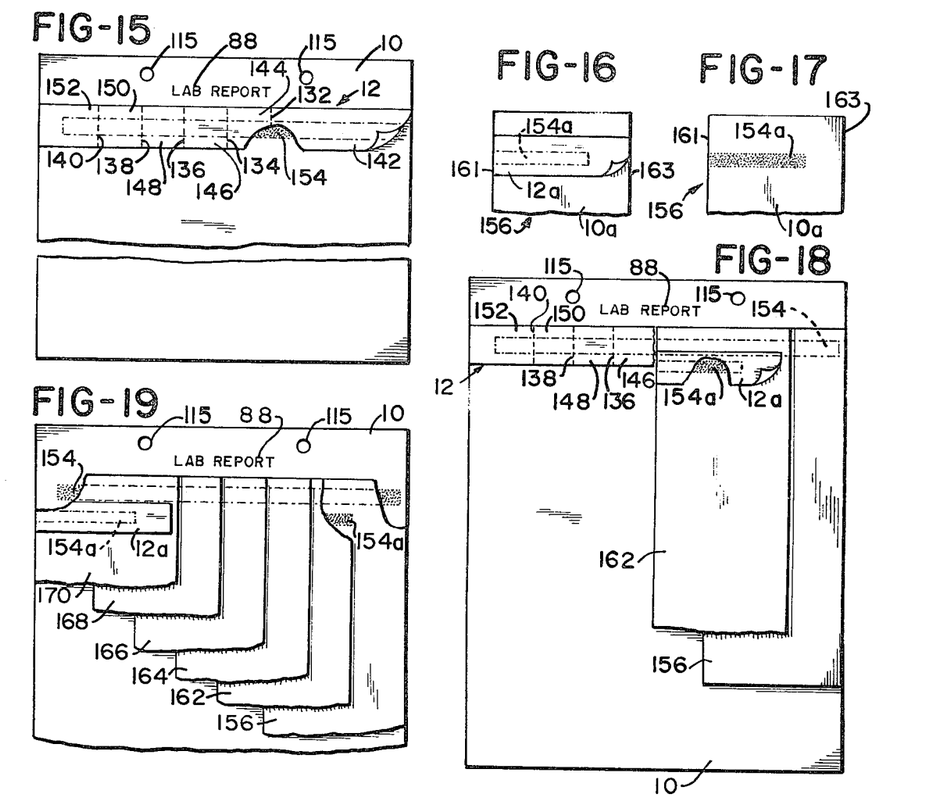
FIG. 15 is a modification of the second article produced from the multi-layer composite of FIG. 2.
FIG. 16 is a portion of the auxiliary sheet for use in conjunction with the article of FIG. 15.
FIG. 17 is a view similar to FIG. 16, with the adhesive exposed.
FIGS. 18 and 19 illustrate sequential steps in the use of the articles of FIGS. 15 and 16.

When utilizing the carrier sheet of FIG. 15 it is desirable to provide a unique lab report from 156 as illustrated in FIGS. 16-18. The lab report form is similar to the carrier sheet of FIG. 15 and produced by the same process, on a smaller scale. A continuous release sheet 12a covers the single band of adhesive 154a contained on base 10a. The release sheet, being readily strippable, is removed when the lab report 156 is to be attached to the carrier sheet of FIG. 17. The adhesive band 154a does not extend the full width of the report, but (see FIG. 17) starts at margin 161 and continues partially across the width of the report to a region near the second margin 163. The adhesive is completely covered by the release sheet 12a until such time as a second lab report 162 is secured thereto, see FIG. 18. When the lab reports are attached to the carrier sheet, the first release sheet panel 142 is removed and the first lab report 156 is attached thereto.

It will be noted that the attachment of the lab report 156 completely covers the exposed portion of the adhesive band 154 thus ensuring that the band will not accidentally adhere to foreign elements.

When the second report 162 is attached to the mounting board, the release sheet 12a is removed from report 156, exposing adhesive band 154a and the panel 144 is likewise removed from the adhesive band 154. Report 162 is then attached to report 156 and the carrier sheet of FIG. 15 as illustrated in FIG. 18. Subsequent reports 164, 166, 168 and 170 may be applied in similar manner, the final form illustrated in FIG. 19.

The release sheet 12a is not removed from the final lab report 170, the adhesive band 154a of report 170 not being utilized. This ensures that the final Lab Report with individual reports assembled thereon will not accidentally become attached to foreign elements during filing.

Figure 20:
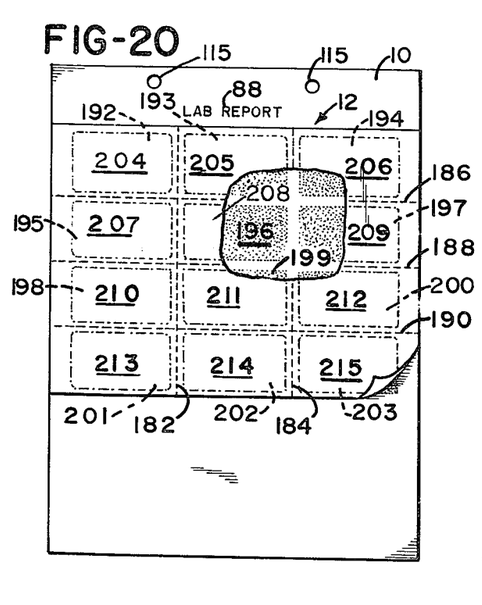
FIG. 20 is a further modification of a second article produced from the multi-layer composite of FIG. 2.
Figure 21:
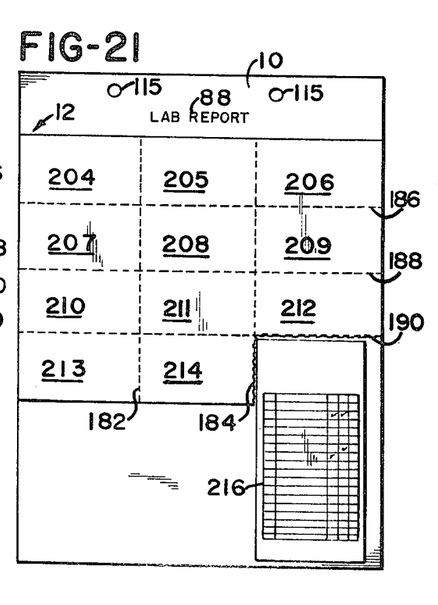
FIG. 21 is an illustration of the article of FIG. 20 with an auxiliary sheet attached thereto.

Another alternative embodiment of the lab report carrier sheet is illustrated in FIGS. 20 and 21. The patterned adhesive is applied in a plurality of independent regions or patches 192-203 at station 28 of FIG. 2. In this embodiment, the release sheet 12 includes both transverse tear lines 182 and 184 applied at 24, and longitudinal tear lines 186, 188, and 190 applied at 26, to provide 12 independent panels 204-215, each panel covering one of the adhesive patches 192-203. FIG. 21 illustrates the attachment of a typical lab report form 216 to one of the panels of the carrier sheet of FIG. 20. Panel 215 of the release sheet is removed from the carrier sheet along lines 184 and 190, exposing adhesive patch 203. As can be seen, the adhesive patch 203 does not extend to the edge of the area exposed when panel 215 is removed from the release sheet 12. Thus, when the lab report 216 is attached to the carrier sheet none of the adhesive will be exposed. As in previous embodiments, subsequent panels may be removed, exposing in sequence the adhesive patches whereby a plurality of lab reports may be mounted on the carrier sheet in echelon fashion.

As can be seen, by utilizing the various embodiments of the second article, i.e., the carrier sheet illustrated in FIGS. 9–21, any variety of report forms can be generated for use with a variety of auxiliary articles. By utilizing the various accumulation techniques herein illustrated the number of lab reports may vary from four to twelve while requiring little additional space in a filing system.

Thus, it can be seen that a variety of articles may be produced from the composite web of the present invention. While the embodiments here described are limited to tamper-proof lottery tickets and lab report carrier or accumulation sheets, it should be understood that any of a variety of other articles may be produced from the composite web without departing from the invention.

What is claimed is:

1. A continuous method of producing a multi-layer composite for subsequent processing into desired information bearing articles, wherein the composite comprises a continuous web of base material, a pressure sensitive adhesive coating selectively applied to portions only of one surface of said web of base material, and a continuous web of strippable release material covering said adhesive, comprising the steps of:
   a. continuously advancing an endless web of base material having an upper and lower surface toward a collating station;
   b. selectively applying pressure sensitive adhesive to a predetermined portion only of the upper surface of said advancing web of base material in advance of said collating station;
   c. continuously advancing an endless web of release material having an upper and lower surface toward said collating station;
   d. collating the lower surface of said advancing web of release material with a portion of the upper surface of said advancing web of base material and in overlying, adhesively secured relationship with the adhesive on the upper surface of said web of base material, whereby to cover only a portion of the upper surface of the web of base material, leaving a portion of the upper surface of the web of base material exposed;
   e. advancing said multi-layer composite to indicia applying means where original indicia is directly applied to the exposed portion of the upper surface of the web of base material;
   f. continuously stripping the web of release material from the web of base material; and
   g. thereafter disposing said adhesive coated portion of said web of base material in overlapping, adhesively secured relationship with said exposed portion of said web, thereby concealing said original indicia thereon, therebetween.

2. A method as called for in claim 1 wherein said adhesive substantially circumscribes the original indicia.

3. A continuous method of producing a multi-layer composite for subsequent processing into desired information bearing articles, wherein the composite comprises a continuous web of base material, a pressure sensitive adhesive coating selectively applied to portions only of one surface of said web of base material, and a continuous web of strippable release material covering said adhesive, comprising the steps of:
   a. continuously advancing an endless web of base material having an upper and lower surface toward a collating station;
   b. delineating an elongate fold line on and extending the length of the web of base material defining therein a pair of elongate, transversely adjacent, interconnected panels spanning the width of the web;
   c. selectively applying pressure sensitive adhesive to a predetermined portion only of the upper surface of one of said pair of panels of said advancing web of base material in advance of said collating station;
   d. continuously advancing an endless web of release material having an upper and a lower surface toward said collating station;
   e. collating the lower surface of said advancing web of release material with the upper surface of said advancing web of base material and in overlying, adhesively secured relationship with the adhesive on the upper surface of one of said pair of panels leaving the upper surface of the other panel of the pair of the web of base material exposed for application of original indicia thereto;
   f. advancing said composite with both of said elongate panels in a flat, side-by-side relationship;
   g. applying original indicia directly to the exposed surface of that panel of the pair which is free of release material;
   h. continuously stripping the web of release material from the composite after the application of original indicia to one of said panels;
   i. then folding said web of base material along said fold line for disposing the indicia bearing surface of one panel and the adhesively coated surface of the other panel in overlapping, adhesively secured relationship, concealing said original indicia therebetween and rendering access thereto impossible without multilation of at least one of said panels.

4. A method as called for in claim 3 which comprises the step of transversely subdividing the continuous length of adhesively secured elongate panels into individual ticket like articles each of which include original indicia which is unique to each individual article.

5. A continuous method of producing a multi-layer composite for subsequent processing into desired information bearing articles, wherein the composite comprises a continuous web of base material, a pressure sensitive adhesive coating selectively applied to portions only of one surface of said web of base material, and a continuous web of strippable release material covering said adhesive, comprising the steps of:
   a. continuously advancing an endless web of base material having an upper and a lower surface toward a collating station;
   b. selectively applying pressure sensitive adhesive to a portion only of the upper surface of said advancing web of base material in advance of said collating station;
   c. continuously advancing an endless web of release material having an upper and a lower surface toward said collating station;
   d. subdividing the endless web of release material into a plurality of elongate, longitudinal strips in advance of the collating station, wherein the adjacent side edges of said strips are releasably interconnected;

e. collating the lower surface of the advancing strips of release material with the upper surface of said advancing web of base material and in overlying, adhesively secured relationship with the adhesive on the upper surface of said web of base material, thus producing a multi-layer composite capable of being further processed into a plurality of information bearing articles by continuous mass production techniques.

6. A method as called for in claim 5, wherein said strips of release material are further transversely subdivided into a plurality of sub-strips the adjacent edges of which are releasably interconnected.

7. A continuous method of producing a multi-layer composite for subsequent processing into desired information bearing articles, wherein the composite comprises a web of base material, an adhesive coating selectively applied to portions only of one side of said web, and a web of release material covering said adhesive, comprising the steps of:
   a. continuously advancing an endless web of base material toward a collating station;
   b. selectively applying pressure sensitive adhesive to a portion only of one surface of said advancing web of base material in advance of said collating station;
   c. continuously advancing an endless web of release material toward said collating station; and
   d. collating the lower surface of said advancing web of release material with a portion only of the upper surface of said advancing web of base material and in overlying, adhesively secured relationship with the adhesive on the upper surface of said web of base material, leaving a portion of the upper surface of the web of base material exposed for application of original indicia thereto, thus producing a multi-layer composite capable of being further processed into a plurality of information bearing articles by continuous mass production techniques.

8. A continuous method of producing a multi-layer composite for subsequent processing into desired information bearing articles, wherein the composite comprises a continuous web of base material, a pressure sensitive adhesive coating selectively applied to portions only of one surface of said web, and a continuous web of strippable release material covering said adhesive, comprising the steps of:
   a. continuously advancing an endless web of base material toward a collating station;
   b. selectively applying pressure sensitive adhesive to a portion only of one surface of said advancing web of base material in advance of said collating station;
   c. continuously advancing an endless web of release material toward said collating station, wherein the web of release material has a width less than the width of the web of base material;
   d. collating said advancing web of release material with said advancing web of base material and in overlying relationship with the adhesive on said web of base material and in covering relationship to only a portion of said one surface of the web of base material, leaving a portion thereof exposed;
   e. applying original indicia to the exposed portion of the web of base material;
   f. continuously stripping the web of release material from the web of base material; and
   g. disposing said adhesive coated portion of said web of base material in overlapping, adhesively secured relationship with said exposed portion of said web, thereby concealing said original indicia therebetween, thus producing a multi-layer composite capable of being further processed into a plurality of information bearing articles by continuous mass production techniques.

9. A method as claimed in claim 2, including the steps of:
   h. applying opaque areas to said web prior to the application of adhesive thereto;
   i. providing an elongate fold line on and extending the full length of the web of base material for defining a pair of elongate, adjacent, interconnected panels collectively spanning the width of said web, wherein said adhesive pattern and web of release material are each disposed primarily on one of said panels;
   j. advancing said composite with both of said elongate panels in flat, side-by-side relationship for applying the original indicia referred to in step e directly to the exposed surface of that panel of the pair which is free of release material;
   k. continuously stripping the web of release material from the composite after the application of the original indicia to one of said panels;
   l. thereafter folding said web of base material along said fold line for disposing the indicia bearing surface of one panel and the adhesively coated surface of the other panel in overlapping, adhesively secured relationship, concealing said original indicia therebetween and rendering access thereto impossible without mutilation of at least on of said panels; and
   m. transversely subdividing the continuous length of adhesively secured elongate panels into individual ticket like articles each of which include concealed original indicia which is unique to each individual article.

10. A method as called for in claim 8, wherein the adhesive is applied in a predetermined, repetitive pattern substantially surrounding areas free of adhesive and wherein the original indicia is applied to exposed portions of the web of base material which are covered by the areas free of adhesive when the adhesive coated portion of the web of base material is disposed in overlapping relationship therewith.

11. A method as called for in claim 10, which includes the step of applying an opaque coating to the indicia receptive portions and the adhesive free areas of the web of base material in advance of the collating station to prevent viewing of the original indicia through the web of base material.

12. A method of continuously producing a multi-layer composite for subsequent processing, wherein the composite comprises a continuous web of base material, a pressure sensitive adhesive selectively applied to the web of base material, and a continuous web of strippable release material covering said adhesive, comprising the steps of:
   a. continuously advancing an endless web of base material toward a collating station;
   b. selectively applying a plurality of transversely spaced, longitudinally extending strips of pressure sensitive adhesive to a portion of one surface of said advancing web of base material in advance of said collating station;

c. continuously advancing an endless web of release material toward the collating station;
d. subdividing said web of release material into a plurality of interconnected, seperable, elongate, longitudinal strips in advance of said collating station; and
e. collating said advancing web of release material with said advancing web of base material for disposing said seperable strips in covering relationship with corresponding stripes of pressure sensitive adhesive on said web of base material.

13. A method as called for in claim 12, wherein said strips of release material are further transversely subdivided into a plurality of sub-strips, the adjacent edges of which are releasably interconnected.

14. A method as called for in claim 13, wherein said adhesive is applied in a plurality of separate patches, and wherein each adhesive patch is covered by a corresponding substrip of the release web.

15. A continuous method of producing a multi-layer composite for subsequent processing, wherein the composite comprises a continuous web of base material, a pressure sensitive adhesive selectively applied to the web of base material, and a continuous web of strippable release material covering said adhesive, comprising the steps of:
a. Continuously advancing an endless web of base material toward a collating station;
b. Selectively applying zones of pressure sensitive adhesive in predetermined, repetitive patterns to a portion of one surface of said advancing web of base material in advance of said collating station;
c. Continuously advancing an endless web of release material toward the collating station;
d. Subdividing said web of release material into a plurality of interconnected, separable panels in advance of said collating station; and
e. Collating said advancing web of release material with said advancing web of base material for disposing said separable panels in covering relationship with corresponding zones of pressure sensitive adhesive on said web of base material.

16. A method as called for in claim 15, wherein said adhesive is applied in an elongate, longitudinally extending stripe and wherein the release panels are transversely subdivided into a plurality of sub-panels which collectively overlie the adhesive stripe.

* * * * *